United States Patent
Rasanen

(10) Patent No.: US 10,715,559 B2
(45) Date of Patent: Jul. 14, 2020

(54) MULTIMEDIA SESSION DOMAIN SELECTION

(75) Inventor: Juha Rasanen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 2114 days.

(21) Appl. No.: 11/730,535

(22) Filed: Apr. 2, 2007

(65) Prior Publication Data

US 2008/0013527 A1 Jan. 17, 2008

Related U.S. Application Data

(60) Provisional application No. 60/788,060, filed on Apr. 3, 2006.

(51) Int. Cl.
*H04L 29/06* (2006.01)

(52) U.S. Cl.
CPC ...... *H04L 65/1016* (2013.01); *H04L 65/1003* (2013.01); *H04L 65/1006* (2013.01)

(58) Field of Classification Search
CPC ........... H04L 29/06027; H04L 65/1069; H04L 69/24; H04W 28/18; H04W 76/02; H04W 36/26; H04W 92/02
USPC ................................................. 370/352–356
See application file for complete search history.

(56) References Cited

U.S. PATENT DOCUMENTS

| | | | |
|---|---|---|---|
| 7,035,923 B1* | 4/2006 | Yoakum et al. | 709/224 |
| 7,209,749 B2* | 4/2007 | Kwak et al. | 455/452.2 |
| 2004/0185826 A1* | 9/2004 | Koskinen | H04M 15/00 455/406 |
| 2005/0060411 A1 | 3/2005 | Coulombe et al. | |
| 2005/0190716 A1* | 9/2005 | Buckley et al. | 370/328 |
| 2005/0283832 A1* | 12/2005 | Pragada | H04L 29/06027 726/12 |
| 2006/0209805 A1* | 9/2006 | Mahdi | H04L 12/6418 370/352 |
| 2007/0097879 A1* | 5/2007 | Bleckert et al. | 370/254 |
| 2007/0165599 A1* | 7/2007 | Skog et al. | 370/352 |

(Continued)

FOREIGN PATENT DOCUMENTS

EP 1 720 365 A1 11/2006
WO WO 2005/011207 A1 2/2005

(Continued)

OTHER PUBLICATIONS

International Search Report PCT/IB2007 filed Oct. 3, 2007.
3GPP, "Technical Specification Group Services and Systems Aspects; Combined Circuit Switched (CS) and IP Multimedia Subsystem (IMS) Sessions; Stage 1 (Release 7)," 3rd Generation Partnership Project, 3GPP TS 22.279 V7.1.0, Dec. 2005.

(Continued)

*Primary Examiner* — Asad M Nawaz
*Assistant Examiner* — Najeeb Ansari
(74) *Attorney, Agent, or Firm* — Mintz Levin Cohn Ferris Glovsky and Popeo, P.C.

(57) ABSTRACT

A user equipment can have simultaneous peer to peer circuit switched and Internet protocol multimedia subsystem communications that allow content presentation to the user. The communicating user equipment can indicate their packet switched Internet protocol multimedia subsystem combinational service capabilities to each other, and further, monitor the capability of the associated radio access network. Thereafter, when a capability exchange is undertaken, session initiation protocol messages can be exchanged between the communicating user equipments to determine and initialize the appropriate conversational communications medium.

17 Claims, 9 Drawing Sheets

(56) References Cited

U.S. PATENT DOCUMENTS

| | | | |
|---|---|---|---|
| 2007/0238466 A1* | 10/2007 | Buckley | H04Q 3/0045 455/445 |
| 2007/0238467 A1* | 10/2007 | Buckley | H04Q 3/0045 455/445 |
| 2007/0238468 A1* | 10/2007 | Buckley | H04Q 3/0045 455/445 |
| 2008/0268818 A1* | 10/2008 | Keller | H04W 4/16 455/414.1 |
| 2008/0274739 A1* | 11/2008 | Wu | 455/435.1 |
| 2008/0287104 A1* | 11/2008 | Sundberg et al. | 455/412.1 |
| 2009/0190579 A1* | 7/2009 | Witzel | H04L 12/5692 370/353 |
| 2009/0303971 A1* | 12/2009 | Kim | H04W 76/022 370/338 |

FOREIGN PATENT DOCUMENTS

| | | |
|---|---|---|
| WO | WO 2005/039132 A1 | 4/2005 |
| WO | WO 2007/089383 A2 | 8/2007 |

OTHER PUBLICATIONS

3GPP, "Technical Specification Group Services and Systems Aspects; Combining Circuit Switched (CS) and IP Multimedia Subsystem (IMS) Sessions; Stage 2 (Release 7)," 3rd Generation Partnership Project, 3GPP TS 23.279 V7.2.0, Mar. 2006.

3GPP, "Technical Specification Group Services and Systems Aspects; Combining Circuit Switched (CS) and IP Multimedia Subsystem (IMS) Sessions; Stage 3 (Release 7)," 3rd Generation Partnership Project, 3GPP TS 24.279 V7.0.0, Mar. 2006.

\* cited by examiner

MULTIMEDIA SESSION DOMAIN SELECTION

BACKGROUND OF THE INVENTION

Field of the Invention

Certain embodiments of the present invention generally relate to simultaneous peer-to-peer circuit switched and Internet protocol multimedia subsystem communication.

Description of the Related Art

With the deployment of support for conversational Internet protocol multimedia subsystem (IMS) in the packet switched (PS) domain, a network operator may have the potential to support conversational services in the circuit switched (CS) domains. In the early days of the deployment of conversational PS services, the probability of an entire network supporting conversational PS services was low. However, when a user equipment (UE) initiates a conversational service in the PS domain, there is a high probability that it will fail. Failure would require the US to re-request the service on the PS domain. This can introduce an unacceptable and substantial delay in the call setup time. To allow a good user experience in terms of call setup time and to reduce the unnecessary signaling traffic, the UE should operate in the CS domain for conversational services.

Once the deployment of conversational PS services has progressed in many markets, the probability of a conversational service being supported by the PS domain will be much greater. As operator and handset manufacturer might generally want the UE to operate in the PS domain as much as possible to allow the user to maximize the advanced functionality of the handset, thus allowing differentiation of the handset and network.

It is important for the UE to know this to be able to select the proper domain (PS or CS) when establishing a conversational multimedia session. It is also important for the IMS to know this to be able to select the proper domain (PS or CS) when a UE terminated conversational multimedia session is established.

CS & IMS combinational services (CSICS) are being specified in the Third Generation Partnership Project (3GPP) Release 7. The basic concept in the specification is that a CSICS capable UE can have simultaneous peer-to-peer CS and IMS communication, and present it within one context to the user. To achieve this, the communicating UEs generally indicate their CSICS capabilities to each other and are aware of the capabilities of the radio access network, i.e. whether the network supports simultaneous CS and PS services. A capability exchange procedure, based on the exchange of session initiation protocol (SIP) messages, is applied between the communicating UEs.

However, a challenge actively being discussed in 3GPP standardization is how the UE and the IMS network know whether a conversational Quality of Service (QoS) is supported between the UE and the IMS, i.e., conversational QoS supported by the UE, by the radio access network, and by the IMS network.

SUMMARY OF THE INVENTION

One embodiment of the present invention is an internet protocol multimedia subsystem. The internet protocol multimedia subsystem is configured to receive information regarding conversational packet switched capabilities from a network element. The internet protocol multimedia subsystem is also configured to store the information. The internet protocol multimedia subsystem is further configured to monitor for an update regarding the conversational packet switched capabilities from the network element. The internet protocol multimedia subsystem is additionally configured to revise the information based on the update.

Another embodiment of the present invention is a network element. The network element is configured to provide information regarding conversational packet switched capabilities of the network element to an internet protocol multimedia subsystem. The network element is also configured to monitor for a change in the conversational packet switched capabilities of the network element. The network element is further configured to provide an update to the internet protocol multimedia subsystem when the change is detected.

A further embodiment of the present invention is a method. The method includes receiving information regarding conversational packet switched capabilities from a network element. The method also includes storing the information. The method further includes monitoring for an update regarding the conversational packet switched capabilities from the network element. The method additionally includes revising the information based on the update. The method can, in certain embodiments, be implemented by a computer system including a computer program embodied on a computer readable medium and encoding instructions for performing the method.

Another embodiment of the present invention is also a method. This method includes providing information regarding conversational packet switched capabilities of a network element to an internet protocol multimedia subsystem. This method also includes monitoring for a change in the conversational packet switched capabilities of the network element. This method further includes providing an update to the internet protocol multimedia subsystem when the change is detected. This method can, in certain embodiments, be implemented by a computer system including a computer program embodied on a computer readable medium and encoding instructions for performing this method.

An additional embodiment of the present invention is an internet protocol multimedia subsystem. This internet protocol multimedia subsystem includes reception means for receiving information regarding conversational packet switched capabilities from a network element. This internet protocol multimedia subsystem also includes storage means for storing the information. This internet protocol multimedia subsystem further includes monitor means for monitoring for an update regarding the conversational packet switched capabilities from the network element. This internet protocol multimedia subsystem additionally includes revision means for revising the information based on the update.

A further embodiment of the present invention is a network element. This network element includes provision means for providing information regarding conversational packet switched capabilities of the network element to an internet protocol multimedia subsystem. This network element also includes monitor means for monitoring for a change in the conversational packet switched capabilities of the network element. The provision means is configured to provide an update to the internet protocol multimedia subsystem when the change is detected.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
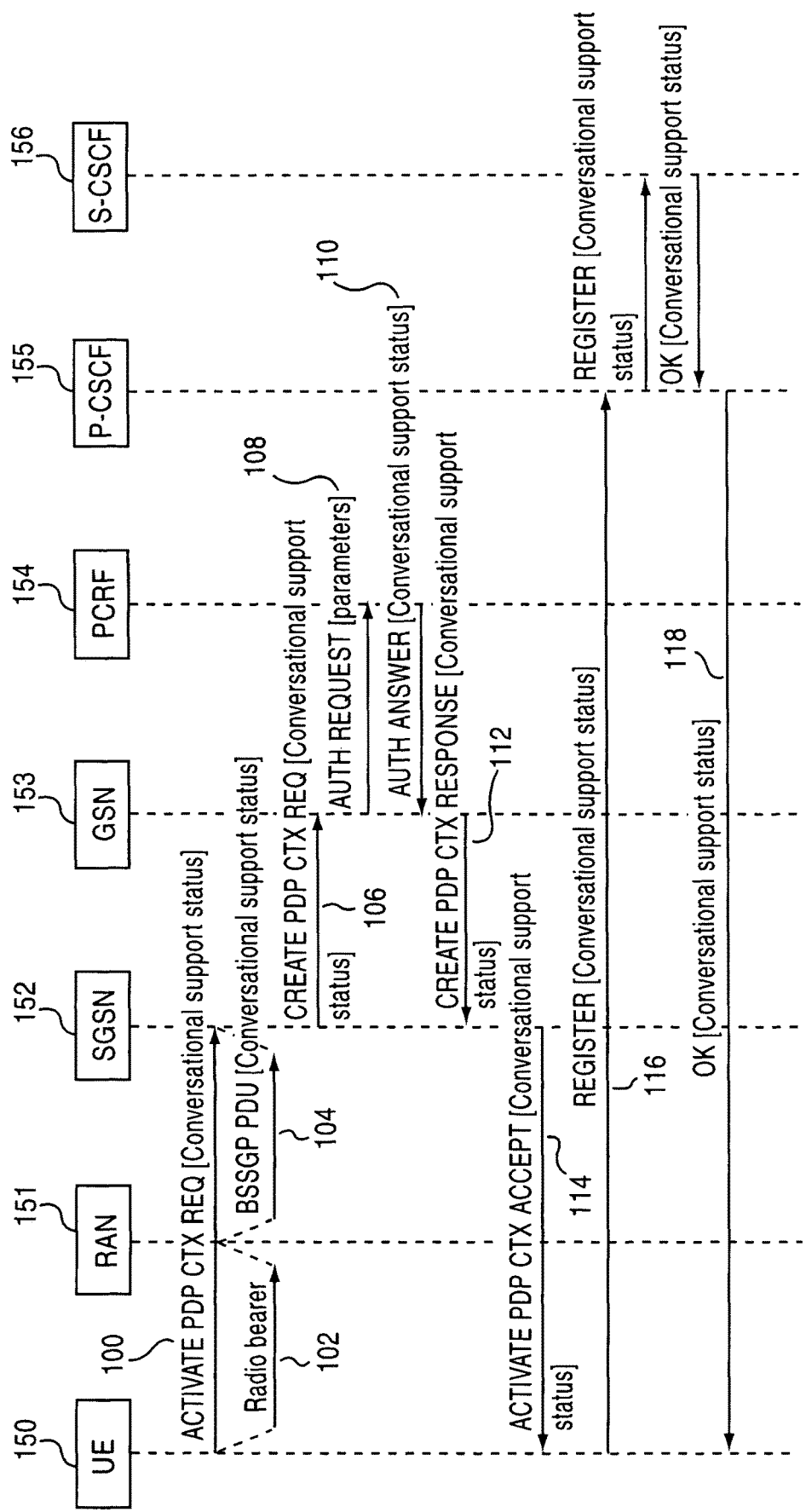
FIG. 1 illustrates a flow diagram of an exemplary PDP context establishment of the invention.

Certain embodiments of the invention generally provide a system and method that allows a network element to have simultaneous peer to peer circuit switched and Internet protocol multimedia subsystem communications that allow content presentation to the user. To accomplish this task, the communicating network elements can indicate their packet switched Internet protocol multimedia subsystem combinational service capabilities to each other, and further, monitor the capability of the associated radio access network. Thereafter, when a capability exchange is undertaken, session initiation protocol messages are exchanged between the communicating network elements.

In one embodiment of the invention, a method for establishing peer to peer conversational communications between at least two user equipments is provided. The method includes sending an activate packet data protocol request from the user equipment to a serving general packet radio service support node, sending a create PDP request from the serving general packet radio service support node to the gateway support node, and sending an authorization request and receiving an authorization answer from a policy and charging rules function module. The method further includes sending a create PDP response from the gateway support node to the serving general packet radio service support node, sending an activate PDP message from the serving general packet radio service support node to the user equipment, and sending and receiving a registration and acknowledge message from the user equipment to a server call session control function module.

In another embodiment of the invention, a method for establishing peer to peer conversational communications between at least two user equipment in a situation where information becomes invalid during the process of handing off a user equipment to another cell is provided. In this embodiment, the method includes, when the information is invalidated at the user equipment, the user equipment conducts a PDP context update, which includes sending an modify packet data protocol request from the user equipment to a serving general packet radio service support node, sending an update PDP request from the serving general packet radio service support node to the gateway support node, and sending an authorization request and receiving an authorization answer from a policy and charging rules function module. The method further includes sending an update PDP response from the gateway support node to the serving general packet radio service support node, sending an activate PDP message from the serving general packet radio service support node to the user equipment, and sending and receiving a registration and acknowledge message from the user equipment to a server call session control function module.

In another embodiment of the invention, a method for establishing peer to peer conversational communications between at least two user equipments, where a radio access network indicates support toward the user equipment is provided. In this embodiment, a UE indicates support to a GGSN when requesting the activation of a PDP context, and this indication is included in a PDP context request message sent from the SGSN to the GGSN. The GGSN then requests PS authorization from the PCRF, and the PCRF responds a supported or unsupported indication. The GGSN responds with a status of the conversational PS support, the SSGN accepts, and the UE registers and is acknowledged by a proxy call session control function.

FIG. 1 illustrates a flow diagram of an exemplary packet data protocol (PDP) context establishment of the invention that includes registration to IMS, along with a general schematic of the structural interconnection between the respective elements of the invention. Specifically, the system of the invention includes a user equipment (UE) 150, a radio access network (RAN) module 151, a serving GPRS support node (SGSN) module, a gateway GPRS support node (GGSN) module 153, a policy and charging rules function (PCRF) module 154, a proxy call state control function (P-CSCF) module 154, and a serving call state control function (S-CSCF) modules 155 and 156. The operator can configure an indication of the support of conversational PS in the policy and charging rules function (PCRF) of its network. The indication may vary, i.e., supported/not supported, for example, per access type, per service, or per subscription. The UE indicates its support of conversational PS to the GGSN when requesting the activation of a PDP context. The indication is included in the PDP context request message illustrated as "ACTIVATE PDP CTX REQ" in step 100, where the UE is communicating with the serving GPRS support node (SGSN) to determine the conversational support status via the indication message. The indication sent from the UE at step 100 may also be sent to the radio access network (RAN) at step 102. The indication of step 101 may be configured to use a spare bit in the QoS or some other information element or a new octet created for this purpose.

Figure 5:
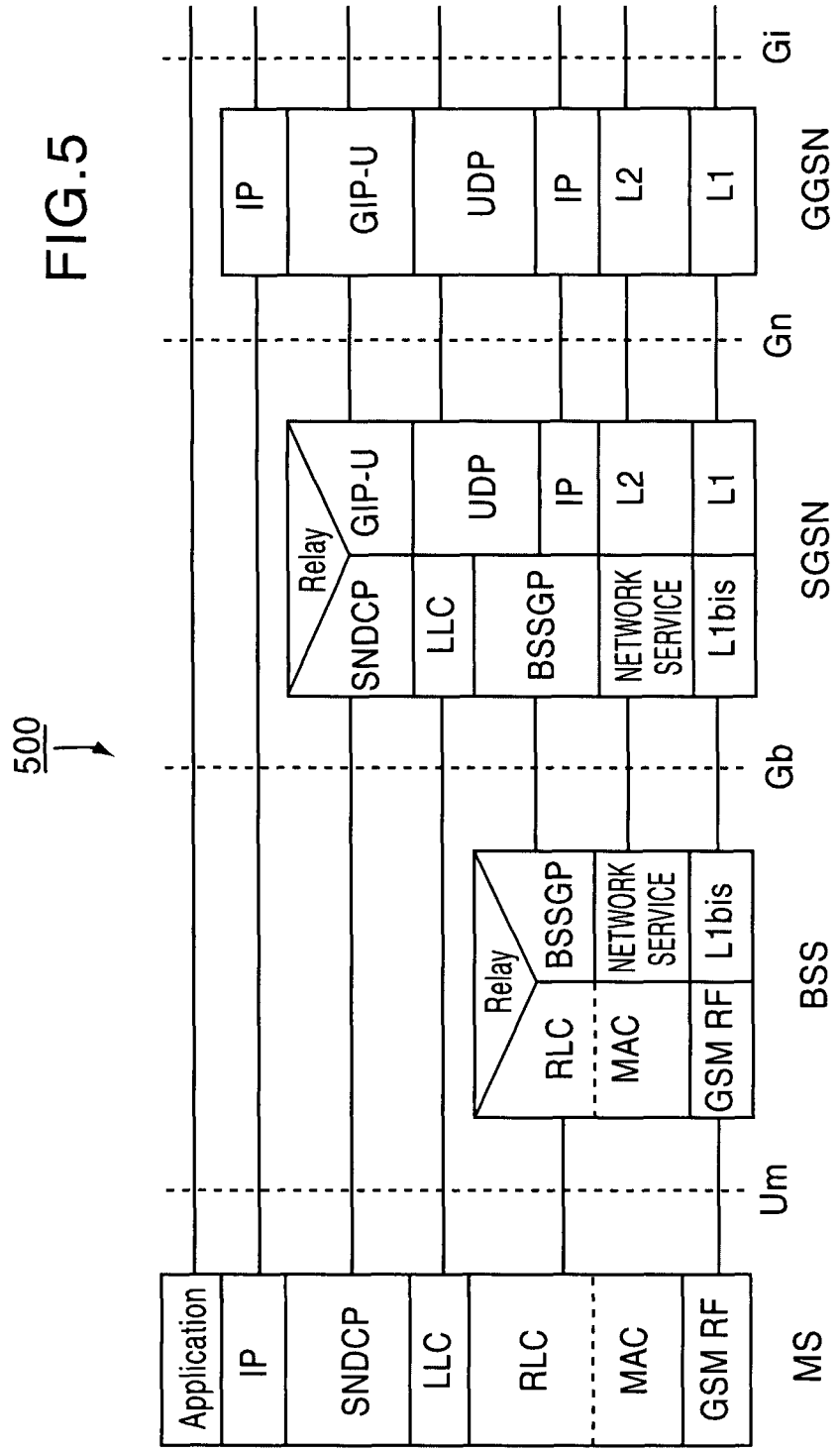
FIG. 5 illustrates an exemplary diagram of a user plane for A/Gb mode of the invention.

After receiving the indication from the UE at step 102, the RAN indicates its support of conversational PS to the SGSN in the underlying protocol messages illustrated as step 104 in FIG. 1, as "BSSGP PDU." For example, in case of A/Gb Mode, the underlying protocol message between the base station subsystem (BSS) and the SGSN is base station subsystem general packet radio service (GPRS) protocol (BSSGP). Exemplary protocol stacks 500 for the A/Gb Mode, i.e., GSM radio access, are illustrated in FIG. 5.

Figure 6:
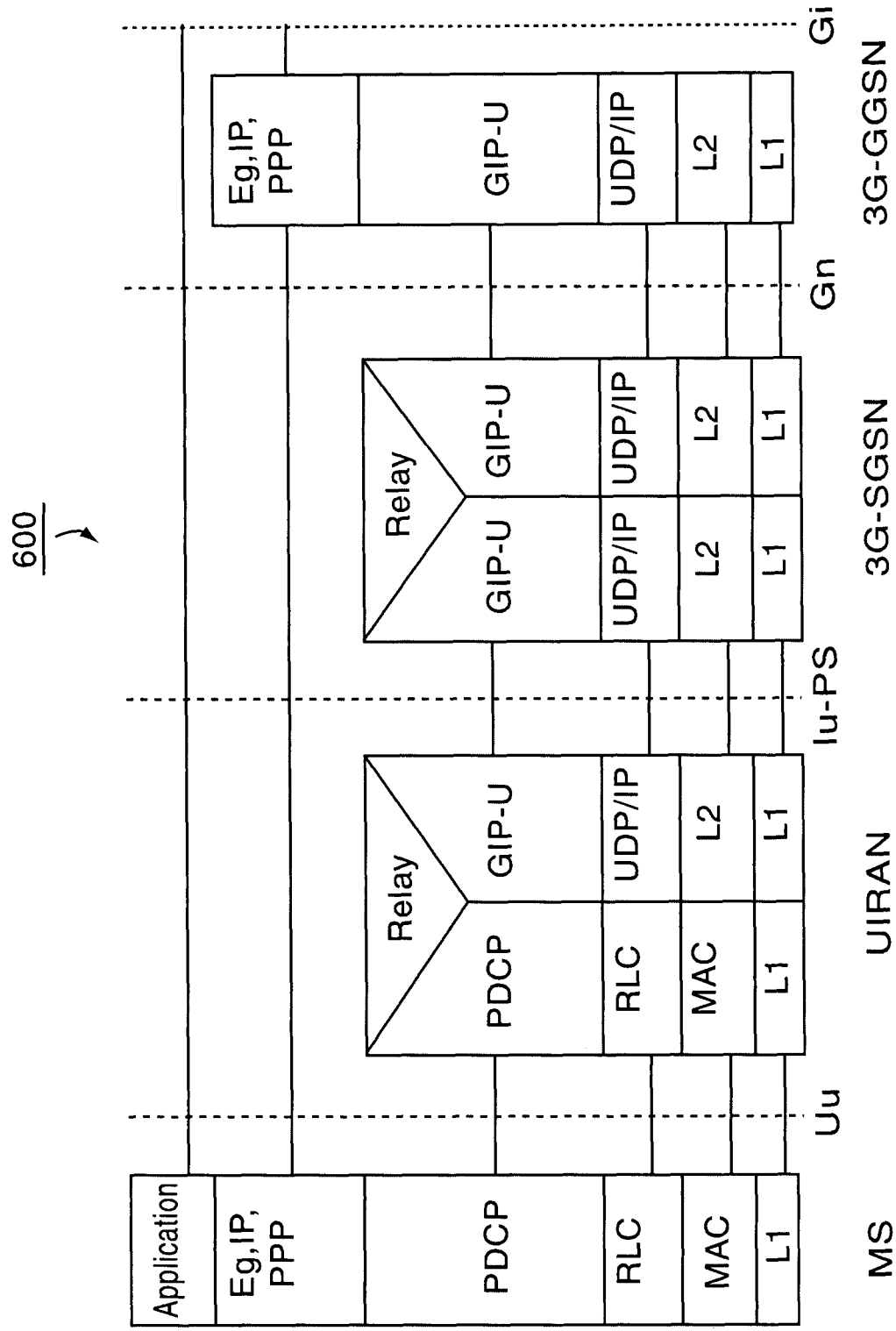
FIG. 6 illustrates an exemplary diagram of a user plane for UTRAN mode of the invention.

The indication shown in step 100 may use, for example, a spare bit in the QoS (or some other) information element of BSS GPRS Protocol (BSSGP), or a new octet that may be created specifically for this purpose. In case of Iu Mode, the "underlying" protocol between the UTRAN and the SGSN may be GPRS tunneling protocol for user plane (GTP-U). Exemplary protocol stacks 600 for the Iu Mode of the universal mobile telecommunications system (UMTS radio access) are generally shown in FIG. 6. The indication can use e.g. a spare bit in the QoS (or some other) information element of BSSGP or a new octet created for this purpose.

After receiving the indication at step 100, at step 106 the SGSN either forwards the indications of the UE and the radio access network to the GGSN within a GTP-U message (CREATE PDP CTX REQ), or alternatively, it may combine the indications to a single indication and forward this indication appropriately. If both the UE and the radio access network support conversational PS, the indication towards the GGSN will generally be "conversational PS supported," otherwise the indication will generally be "conversational PS not supported." The GGSN request "conversational PS authorization" from the PCRF, possibly with an access type indication or with other related parameters, as illustrated in exemplary step 108 as "AUTH REQUEST." The PCRF responds with a relevant "conversational PS supported", or "conversational PS not supported" indication, as illustrated in step 110 as "AUTH ANSWER." The GGSN may respond to the PDP context creation request and indicate the status of the conversational PS support at step 112. Specifically, if both the UE, the radio access network, and the PCRF indicated support for the PS protocol, then the indication in the PDP context creation response is generally "conversational PS supported." Otherwise, an indication of "conversational PS not supported" is generally given. These responses or indications are represented as "CREATE PDP CTX RESPONSE" in step 112.

Thereafter, the SGSN may send a message to the UE indicating the conversational support status. Step 114 illustrates the conversational support status message sent from the SGSN to the UE as "ACTIVATE PDP CTX ACCEPT." If the UE gets a response of "conversational PS supported" in the PDP context creation response, the UE indicates the "conversational PS supported" to the S-CSCF in the IMS registration message illustrated in step 116 as SIP messages "REGISTER" and "OK." Now, these messages having been exchanged, both the UE and the S-CSCF know that conversational PS is supported between the UE and the IMS.

Figure 2:
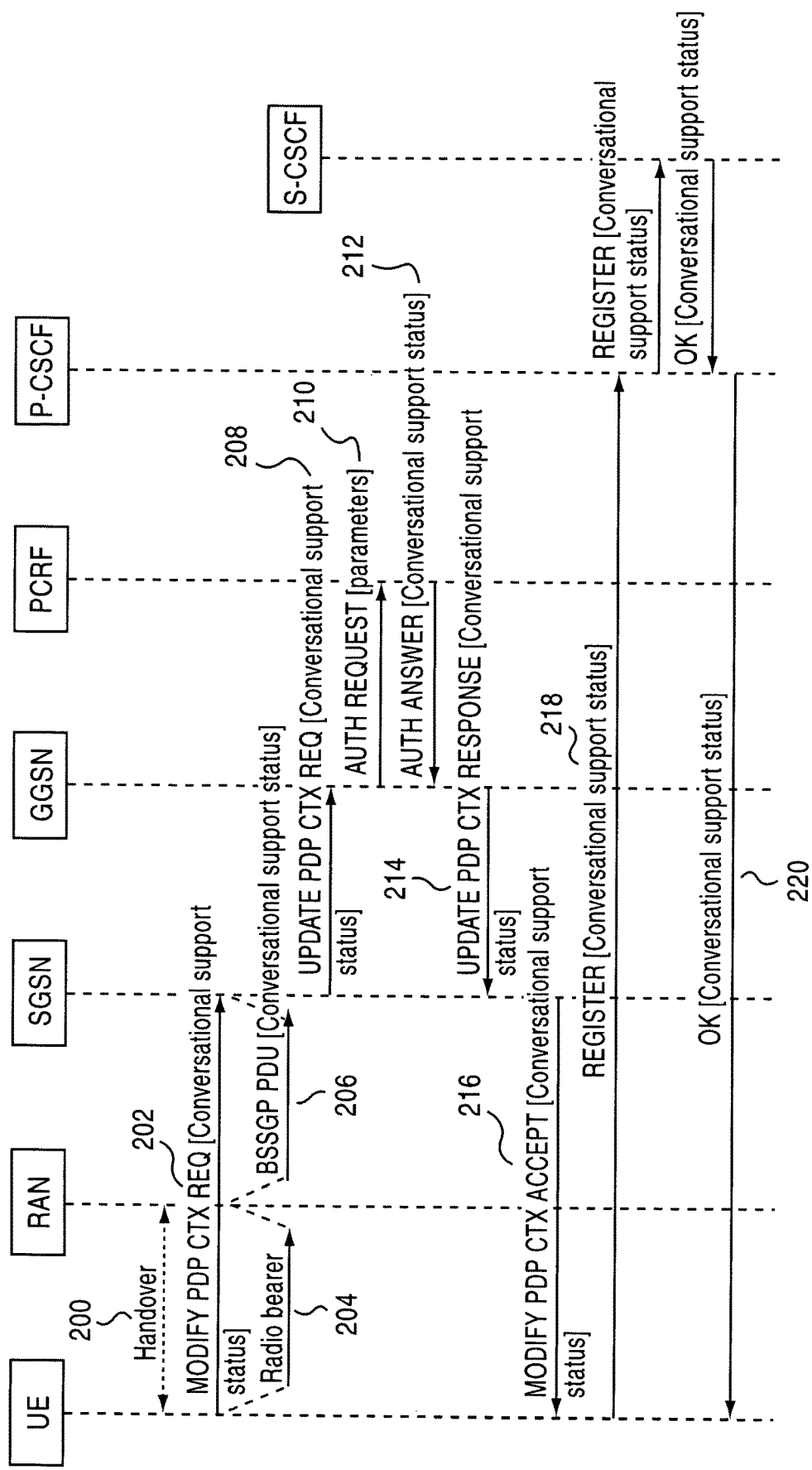
FIG. 2 illustrates a flow diagram of an exemplary handover and radio cell change of the invention.

FIG. 2 illustrates a flow diagram of an exemplary handover and radio cell change according to an embodiment of the invention. In the process of establishing conversational protocol, the information may become invalid as soon as the UE is handed over to another cell or even to another access type. In this scenario, the handover, represented generally as step 200 in FIG. 2, is handled with the following exemplary method. First, when the information is invalidated at the UE, e.g. due to a handover, the UE performs a PDP context update. The context update is represented by "MODIFY PDP CTX REQ" at step 202. Thereafter, a similar process as described above with respect to FIG. 1 is conducted, e.g., a UE—access network—GGSN—PCRF and back to the UE information flow takes place, as illustrated by steps 204, 206, 208, 210, 212, 214, 216, 218, and 220.

As an alternative, the PCRF could be by-passed and the conclusion made by the GGSN, i.e., the AUTH REQUEST and AUTH ANSWER steps illustrated as 210 and 212 in FIG. 2 may be eliminated. If the UE gets a PDP context modification response that indicates a change in the status of the support of conversation PS, the UE may make a re-registration to the IMS to update the status in the S-CSCF, as illustrated in FIG. 2 at steps 218 and 220.

The base stations and Node Bs can indicate their support of conversational PS to the radio network controllers (BSC, RNC) using a similar indication in their underlying protocols, or the radio network controllers may simply be configured to know which base stations under their control support conversational PS and which do not. In one embodiment of the invention, a radio access network indicates support towards UE. For example instead of the radio access network indicating the support of conversational PS towards the SGSN, the radio access network may indicate the support towards the UE. In this example embodiment of the invention, the method illustrated in FIG. 3 may be used.

Figure 3:
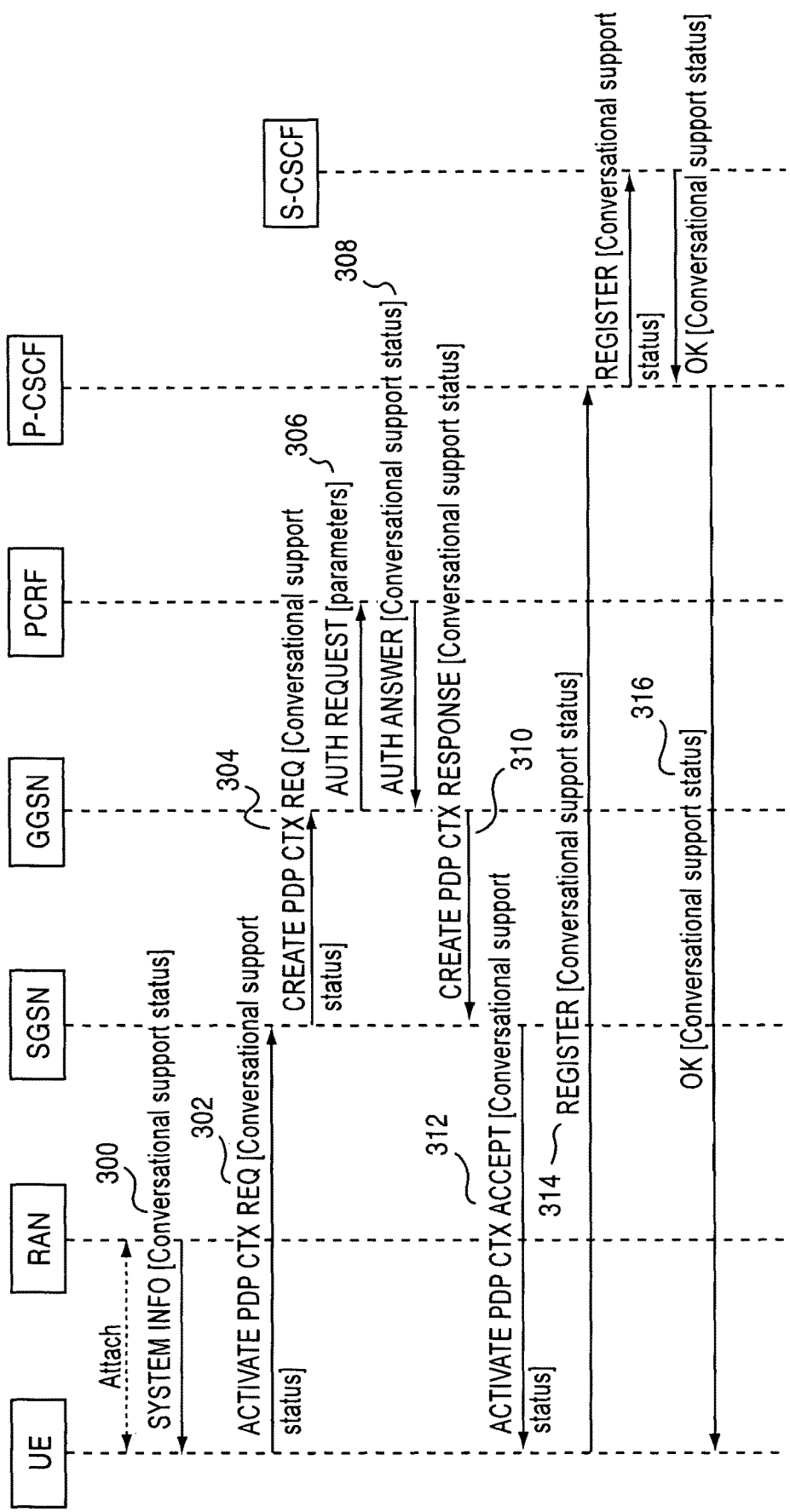
FIG. 3 illustrates a flow diagram of an exemplary attachment to a radio network and primary PDP context establishment process of the invention.

In the exemplary method illustrated in FIG. 3, the operator configures an indication of the support of conversational PS in the PCRF(s) of its network. The indication may vary (i.e. supported/not supported) e.g. per access type or per service or per subscription. The radio access network may indicate support of conversational PS to the UE as "system information," where system information, as per current specifications, is a set of parameters delivered by the base station to the UE each time the UE enters a new radio cell. The system information process is illustrated in FIG. 3 as "SYSTEM INFO" at step 300.

If both the UE and the radio access network support conversational PS, the UE indicates the support to the GGSN when requesting the activation of a PDP context. The support is indicated by the "ACTIVATE PDP CTX REQ" illustrated at step 302. This indication is included in the PDP context request message sent from the SGSN to the GGSN at step 304. The indication can use, for example, a spare bit in the QoS (or some other) information element or a new octet created for this purpose. The GGSN request "conversational PS authorization" from the PCRF, possibly with an access type indication or with other related parameters, is illustrated by the "AUTH REQUEST" step 306. The PCRF responds with a relevant "conversational PS supported," or "conversational PS not supported" indication, as illustrated by the response "AUTH ANSWER" at step 308. The GGSN responds to the PDP context creation request and indicates the status of the conversational PS support at step 310. If the UE, the radio access network, and the PCRF all indicate support for conversational PS, then the indication in the PDP context creation response is "conversational PS supported." If the conditions are not satisfied, the indication in the PDP context creation will generally be "conversational PS not supported," which is part of the "CREATE PDP CTX RESPONSE" illustrated in step 310. If the UE gets "conversational PS supported" in the PDP context creation response, then the UE indicates the "conversational PS supported" to the S-CSCF in the IMS registration message, as shown in the SIP messages "REGISTER" and "OK" in steps 314 and 316. At this stage of the method of the invention, both the UE and the S-CSCF know that conversational PS is supported between the UE and the IMS.

Figure 4:
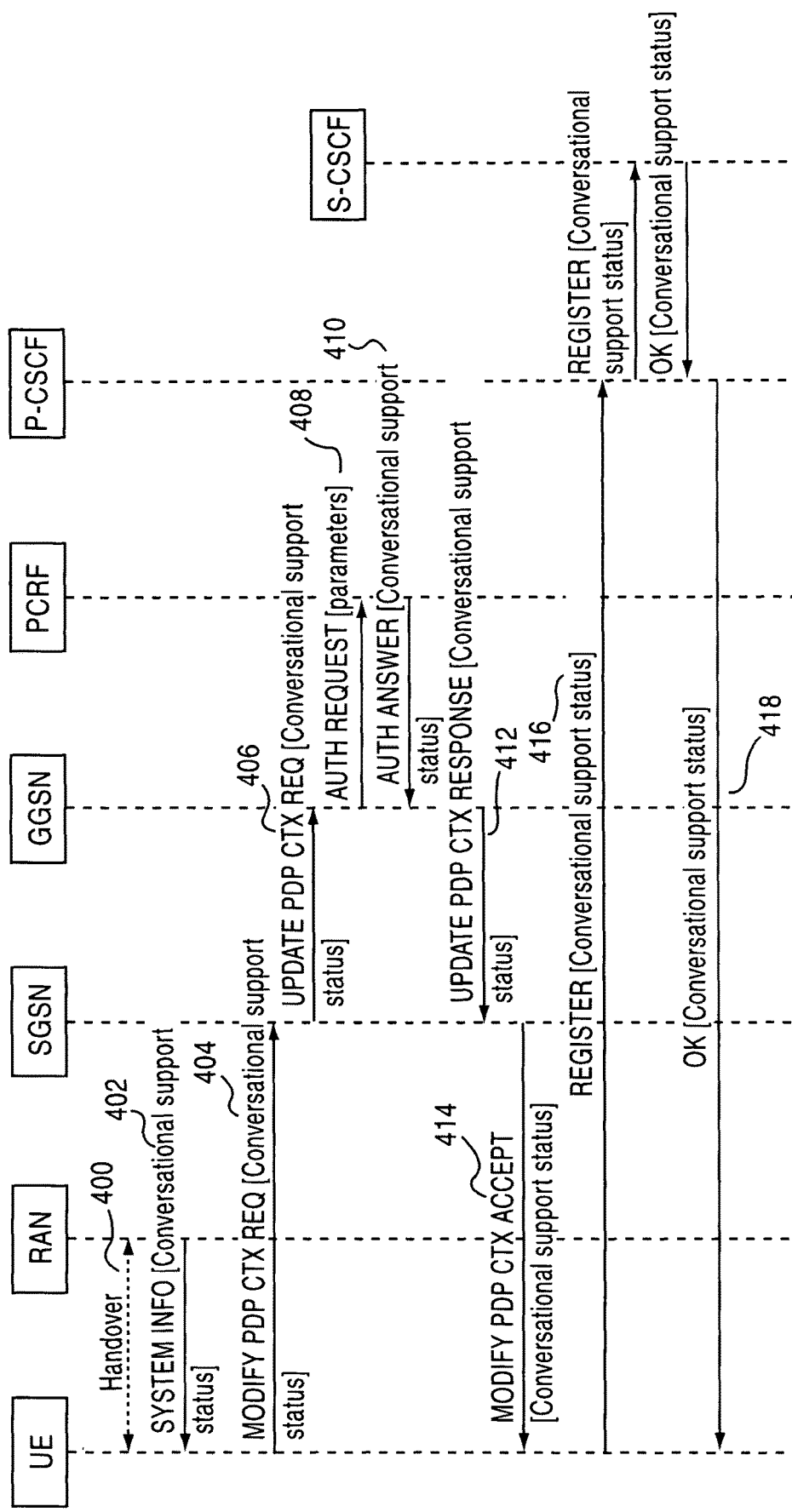
FIG. 4 illustrates a flow diagram of a handover, radio cell change, and UE update of PDP context if the system IFO indicates a change of conversational status.

FIG. 4 illustrates a flow diagram of a handover, radio cell change, and UE update of PDP context if the system IFO indicates a change of conversational status. In the situation where the information becomes invalid as soon as the UE is handed over to another cell, as shown in step 400, or even to another access type, the present invention utilized a novel method to address the situation. Specifically, when the information is invalidated at the UE, e.g., due to a handover 400 and system information step 402, the UE performs a PDP context update. The context update is illustrated as step 404 in FIG. 4 as "MODIFY PDP CTX REQ". Then a similar UE—access network—GGSN—PCRF and back to the UE information flow takes place, as shown in steps 406-418 and as described above. As an alternative, the PCRF could be by-passed and the conclusion made by the GGSN, i.e. in the "AUTH REQUEST" and "AUTH ANSWER" steps illustrated as 408 and 410 in FIG. 4. If the UE gets a PDP context modification response that indicates a change in the status of the support of conversation PS, then the UE may conduct a re-registration to the IMS to update the status in the S-CSCF, as illustrated in FIG. 4 with SIP message steps 416 and 418 the "REGISTER" and "OK" SIP messages.

Figure 7:
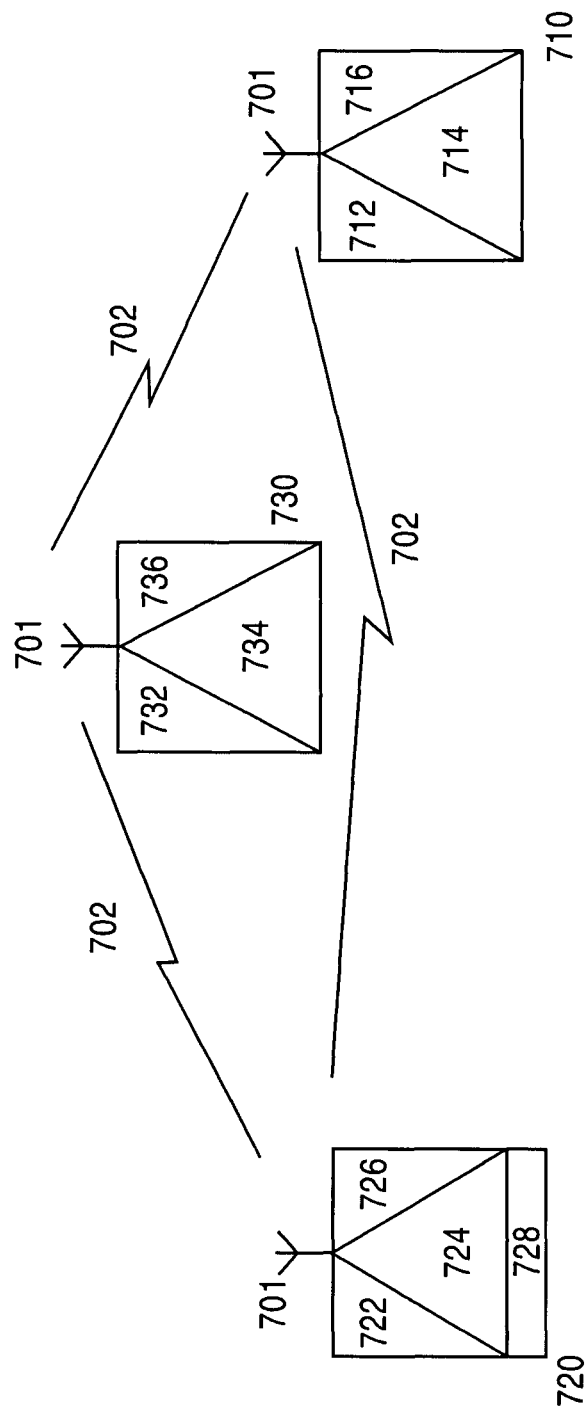
FIG. 7 illustrates a system according to an exemplary embodiment of the present invention.

FIG. 7 illustrates an embodiment of a system including a network element 710, an internet protocol multimedia subsystem (IMS) 720, and optionally an intermediate element 730. The various elements 710, 720, and 730 are shown connected by antennas 701 and wireless links 702, but wireless communication technologies used to interconnect these elements is merely by way of illustration, and the invention is not limited to that particular architecture.

Each of the elements 710, 720, and 730 may include a receiver (respectively 712, 722, and 732), a transmitter (respectively 716, 726, and 736), and a processor (respectively 714, 724, and 734).

The IMS 720, and particularly, the processor 724 and receiver 722 thereof, can be configured to receive information regarding conversational packet switched capabilities from the network element 710. The IMS 720 and the processor 724 thereof can be configured to store the information in a memory 728 thereof. The memory can be implemented by, for example, a hard drive, a rewritable compact disk, an electronically programmable memory, or a smart card. The other elements 710, 730 of the system may also include a memory, although such is not shown in FIG. 7.

The IMS 720, and particularly, the processor 724 and receiver 722 thereof, can be configured to monitor for an update regarding the conversational packet switched capabilities from the network element 710. The IMS 720 and the processor 724 can also be configured to revise the information in the memory 728 based on the update.

The IMS 720 can be configured to receive the information regarding conversational packet switched capabilities from the network element 710 via an intermediate node 730, such as a proxy call state control function.

The IMS 720 can be configured to receive the information regarding conversational packet switched capabilities as a registration message such as a session initiation protocol (SIP) REGISTER message. Likewise, the IMS 720 can be configured to monitor for the update by monitoring for a new registration message from the network element 710.

The network element 710 can be, for example, at least one of a user equipment, a base station, a relay node, a Node B, or an evolved Node B.

The information and the update that are provided to the IMS 720 by the network element 720 can be derived from a response from at least one of a radio access network (as illustrated, for example, in FIGS. 3-4) or from a serving general packet radio subsystem support node (as illustrated, for example, in FIGS. 1-2).

Similarly, the network element 710 and its processor 714 and transmitter 716 can be configured to provide information regarding conversational packet switched capabilities of the network element 710 to the IMS 720. The network element 710 and its processor 714 and receiver 712 can be configured to monitor for a change in the conversational packet switched capabilities of the network element. Furthermore, the network element 710 and its processor 714 and transmitter 716 can be configured to provide an update to the internet protocol multimedia subsystem when the change is detected.

The network element 710 and its processor 714 and receiver 712 can be configured to monitor for the change by monitoring for a response received from at least one of a radio access network or a serving general packet radio subsystem support node.

The network elements 710, 720, and 730 can respectively be implemented by a computer system. For example, the network elements 710, 720, and 730 can be implemented, at least in part, by a general purpose computer or application specific integrated circuit (ASIC). The computer or ASIC can be equipped with a random access memory and a read-only memory. The computer or ASIC may be implemented, in certain instances, by the processor of a network terminal such as a mobile phone, personal digital assistant, or other mobile communications electronics.

Figure 8:
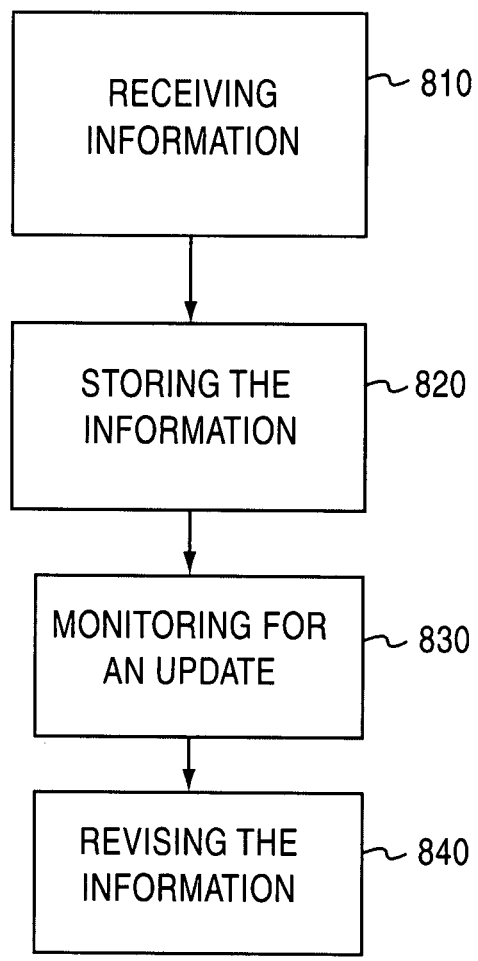
FIG. 8 illustrates a flow chart of a method according to a particular embodiment of the present invention.

FIG. 8 illustrates a method according to an embodiment of the present invention. As shown in FIG. 8, the method can including receiving 810 information regarding conversational packet switched capabilities from a network element. The method can also include storing 820 the information. The method can further include monitoring 830 for an update regarding the conversational packet switched capabilities from the network element. The method can additionally include revising 840 the information based on the update.

The receiving 810 the information can include receiving the information from the network element via a proxy call state control function. Furthermore, the receiving 810 the information can include receiving the information as a registration message.

The monitoring 830 for the update can include monitoring for a new registration message from the network element. 21. Moreover, the monitoring 830 for the update can include monitoring for an update that is based on a response received from at least one of a radio access network or a serving general packet radio subsystem support node.

The receiving 810 the information can include receiving information regarding the conversational packet-switched capabilities of at least one of a user equipment, a base station, a relay node, a Node B, or an evolved Node B. The receiving 810 the information can similarly include receiving information derived from at least one of a radio access network or a serving general packet radio subsystem support node.

Figure 9:
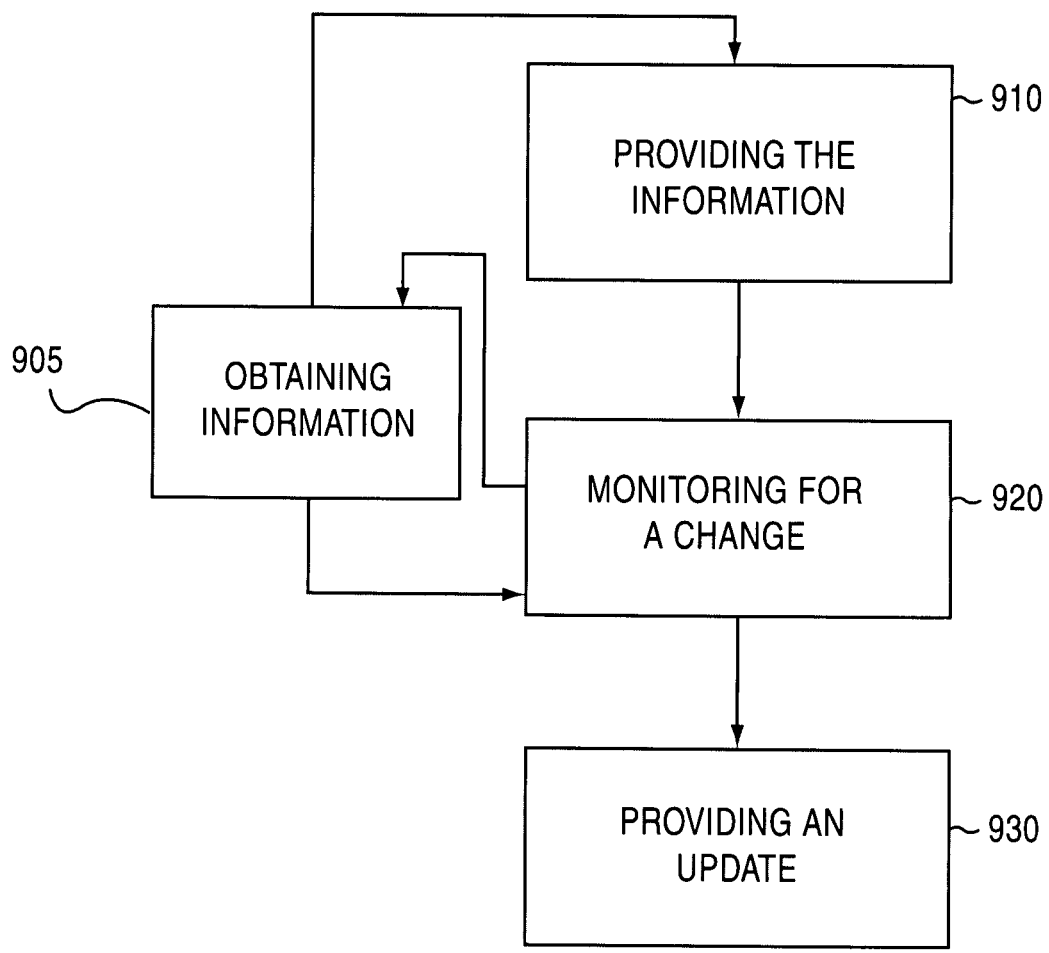
FIG. 9 illustrates a flow chart of another method according to an embodiment of the present invention.

FIG. 9 illustrates another method according to an embodiment of the present invention. As shown in FIG. 9, the method can include providing 910 information regarding conversational packet switched capabilities of a network element to an internet protocol multimedia subsystem. The method can also include monitoring 920 for a change in the conversational packet switched capabilities of the network element. The method can additionally include providing 930 an update to the internet protocol multimedia subsystem when the change is detected.

The providing 910 the information or providing 930 the update (or both) can be performed via a proxy call state control function. Likewise, the providing 910 the information or providing 930 the update (or both) can include providing the information in a registration message.

The monitoring 920 for the change comprises monitoring for a handover to a radio access network that does not have a same conversational packet switched capability as the conversational packet switched capabilities provided to the internet protocol multimedia subsystem in the providing 910 the information. 28. Similarly, the monitoring 920 for the change comprises monitoring for a response received from at least one of a radio access network or a serving general packet radio subsystem support node.

The providing 910 the information or providing 930 the update (or both) can include providing information regarding conversational packet switched capabilities of at least one of a user equipment, a base station, a relay node, a Node B, or an evolved Node B.

The method can further include obtaining 905 the information regarding conversational packet switched capabilities from at least one of a radio access network or a serving general packet radio subsystem support node.

One having ordinary skill in the art will readily understand that the invention as discussed above may be practiced with steps in a different order, and/or with hardware elements in configurations that are different than those that are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the claims.

What I claim is:

1. A method, comprising:
   sending, by a user equipment towards a network element of a network, an attachment request comprising a first indication of support by the user equipment for an internet protocol multimedia subsystem voice over a packet switched session;
   receiving, at the user equipment and from the network element, a response to the attachment request, the response comprising a second indication of whether the network can support internet protocol multimedia subsystem voice over the packet switched session for the user equipment;
   establishing, at the user equipment and in response to the network supporting the internet protocol multimedia subsystem voice over the packet switched session, the packet switched session;
   monitoring, by the user equipment, a change associated with the internet protocol multimedia subsystem voice over the packet switched session; and
   providing, by the user equipment and to the network in response to the change, an update message comprising a third indication of whether the user equipment supports the internet protocol multimedia subsystem voice over the packet switched session or supports a circuit switch voice.

2. The method of claim 1, further comprising:
   establishing, at the user equipment and in response to the network not supporting the internet protocol multimedia subsystem voice over the packet switched session, a circuit switched session.

3. The method of claim 1, wherein the attachment request is included in an attachment procedure.

4. The method of claim 1, wherein the attachment request comprises and/or is comprised in a packet data protocol context request message, and wherein the response comprises and/or is comprised in a packet data protocol context accept message.

5. The method of claim 1, wherein the update message comprises and/or is comprised in a packet data protocol context update message.

6. The method of claim 1, wherein the network element comprises and/or is comprised in at least one of a radio access network or a serving general packet radio subsystem support node.

7. An apparatus comprising:
   at least one processor; and
   at least one memory including instructions, which when executed by the at least one processor causes the apparatus to at least:
   send, towards a network element of a network, an attachment request comprising a first indication of support by the apparatus for an internet protocol multimedia subsystem voice over a packet switched session;
   receive, from the network element, a response to the attachment request, the response comprising a second indication of whether the network can support internet protocol multimedia subsystem voice over the packet switched session for the apparatus;
   establish, based on the network supporting the internet protocol multimedia subsystem voice over the packet switched session, the packet switched session;
   monitor, by the apparatus, a change associated with the internet protocol multimedia subsystem voice over the packet switched session; and
   provide, by the apparatus and to the network in response to the change, an update message comprising a third indication of whether the apparatus supports the internet protocol multimedia subsystem voice over the packet switched session or supports a circuit switch voice.

8. The apparatus of claim 7, wherein the apparatus is further caused to at least:
   establish, based on the network not supporting the internet protocol multimedia subsystem voice over the packet switched session, a circuit switched session.

9. The apparatus of claim 7, wherein the attachment request is included in an attachment procedure.

10. The apparatus of claim 7, wherein the attachment request comprises and/or is comprised in a packet data protocol context request message, and wherein the response comprises and/or is comprised in a packet data protocol context accept message.

11. The apparatus of claim 7, wherein the update message comprises and/or is comprised in a packet data protocol context update message.

12. The apparatus of claim 7, wherein the network element comprises and/or is comprised in at least one of a radio access network or a serving general packet radio subsystem support node.

13. The apparatus of claim 7, wherein the apparatus comprises and/or is comprised in a user equipment device.

14. A non-transitory computer-readable medium storing instructions which, when executed by at least one processor, cause operations comprising:
   sending, by a user equipment towards a network element of a network, an attachment request comprising a first indication of support by the user equipment for an internet protocol multimedia subsystem voice over a packet switched session;
   receiving, at the user equipment and from the network element, a response to the attachment request, the response comprising a second indication of whether the network can support internet protocol multimedia subsystem voice over the packet switched session for the user equipment;
   establishing, at the user equipment and based on the network supporting the internet protocol multimedia subsystem voice over the packet switched session, the packet switched session;

monitoring, by the user equipment, a change associated with the internet protocol multimedia subsystem voice over the packet switched session; and providing, by the user equipment and to the network in response to the change, an update message comprising a third indication of whether the user equipment supports the internet protocol multimedia subsystem voice over the packet switched session or supports a circuit switch voice.

15. The non-transitory computer-readable medium of claim 14, wherein the operations further comprise:

establishing, at the user equipment and based on the network not supporting the internet protocol multimedia subsystem voice over the packet switched session, a circuit switched session.

16. The non-transitory computer-readable medium of claim 14, wherein the attachment request comprises and/or is comprised in a packet data protocol context request message, and wherein the response comprises and/or is comprised in a packet data protocol context accept message.

17. The non-transitory computer-readable medium of claim 14, wherein the update message comprises and/or is comprised in a packet data protocol context update message.

* * * * *